(12) United States Patent
Baba (10) Patent No.: US 9,495,315 B2
(45) Date of Patent: Nov. 15, 2016

(54) INFORMATION PROCESSING DEVICE AND DATA COMMUNICATION METHOD

(71) Applicant: NIDEC SANKYO CORPORATION, Nagano (JP)

(72) Inventor: Tsutomu Baba, Nagano (JP)

(73) Assignee: NIDEC SANKYO CORPORATION, Nagano (JP)

(*) Notice: Subject to any disclaimer, the term of this patent is extended or adjusted under 35 U.S.C. 154(b) by 604 days.

(21) Appl. No.: 13/969,945

(22) Filed: Aug. 19, 2013

(65) Prior Publication Data

US 2014/0089544 A1    Mar. 27, 2014

(30) Foreign Application Priority Data

Sep. 26, 2012  (JP) ................................ 2012-212213

(51) Int. Cl.
*G06F 13/42* (2006.01)
*G06F 13/362* (2006.01)

(52) U.S. Cl.
CPC ............. *G06F 13/362* (2013.01); *G06F 13/42* (2013.01); *G06F 13/4282* (2013.01); *G05B 2219/1215* (2013.01); *G05B 2219/2231* (2013.01); *G06F 2213/0016* (2013.01)

(58) Field of Classification Search
CPC .. G06F 13/362; G06F 13/42; G06F 13/4282; G06F 2213/0016; G05B 2219/1215; G05B 2219/2231
USPC .................................................. 710/105, 110
See application file for complete search history.

(56) References Cited

U.S. PATENT DOCUMENTS

| | | | |
|---|---|---|---|
| 2008/0177917 A1* | 7/2008 | Cagno | G06F 13/4291 710/110 |
| 2008/0178033 A1* | 7/2008 | Cagno | G06F 1/24 713/501 |
| 2008/0195783 A1* | 8/2008 | Deshpande | G06F 13/4291 710/110 |
| 2011/0208885 A1* | 8/2011 | Kwek | G06F 13/4072 710/107 |

FOREIGN PATENT DOCUMENTS

WO      2006090473 A1    8/2006

* cited by examiner

*Primary Examiner* — Glenn A Auve
(74) *Attorney, Agent, or Firm* — Cantor Colburn LLP (57) ABSTRACT

An information processing device may include a master device and at least one slave device, which may be connected each other by using two types of signal lines comprising a serial clock line and a serial data line. A datum may be transmitted between the master device and the slave device according to a predetermined communication method by using the two types of signal lines. If either the master device resets the slave device, or a power supply to the master device and the slave device is turned on, the slave device may commence a starting operation. A notification of a starting condition may be provided to the master device by way of at least one of the serial clock line and the serial data line.

11 Claims, 7 Drawing Sheets

BLOCK DIAGRAM OF KEY PART CONFIGURATION

INFORMATION PROCESSING DEVICE AND DATA COMMUNICATION METHOD

CROSS REFERENCE TO RELATED APPLICATION

The present invention claims priority under 35 U.S.C. §119 to Japanese Application No. 2012-212213 filed Sep. 26, 2012, the entire content of which is incorporated herein by reference.

FIELD OF THE INVENTION

The present invention relates to an information processing device and a data communication method, in which a master device and a slave device are connected each other by using two types of signal lines, namely a serial clock line and a serial data line, in order to carry out data communication by means of a predetermined communication method.

BACKGROUND

For example, the I²C communication (called 'I-squared-C'; that is an abbreviation of 'Inter-Integrated Circuit') is known as data communication to be carried out by a master device and a slave device by way of two types of signal lines, namely a serial clock line and a serial data line, wherein bus specifications of the I²C communication being proposed and put into practical use by Philips.

Meanwhile, ICs such as an EEPROM, accessible by way of the I²C communication, are widely produced and on the market. ICs according to the I²C communication standards are called I²C devices.

Known is a device having a structure in which a single master device and a plurality of slave devices are connected by using a serial clock line and a serial data line, as an I²C device (for example, refer to FIG. 5 of Patent Document 1). A potential of the serial clock line and the serial data line is pulled up to a power-supply voltage via resistor. All signals including a data signal and a clock signal are arbitrarily generated by decreasing the high-leveled signal line level down to a low level.

In the I²C communication, information of a command, a datum, and the like is transmitted from the master device to the slave devices by the byte (8 bits). Moreover, an address is transmitted, for example, by using either 7 bits or 10 bits.

While one-byte information is transmitted from the master device to a slave device, the slave device having received the information returns an acknowledge signal attached to each byte. Then, the master device having received the acknowledge signal transmits a next byte. A series of operations described above are repeated until an end of communication.

In the I²C communication, the master device controls all of a start & end of communication, an address assignment, a direction of data sending/receiving (to control writing/reading data, in the view from the master device side), generating an acknowledge signal, and generating & sending a clock signal.

In this regard, a slave device is provided with a right for the slave device itself not to return the acknowledge signal, or to forcibly lower a signal level of the serial clock line in the case where the slave device becomes unable to receive a data byte, or it is desired to delay data receiving by way of internal processing.

Thus, a system in the I²C communication is standardized in such a way that a slave device can receive information without any incorrect operation during a data receiving operation.

Patent Document 1: Japanese Unexamined Patent Application Publication (Translation of PCT Application) No. 2006-090473

Unfortunately, I²C does not specify any arrangement for protection against incorrect operation caused due to an initialization processing operation in the case where it becomes necessary to return a slave device into an initial condition, either after a master device resets the slave device, or after turning on the power supply.

Therefore, after resetting the slave device by some means, the master device has no way of checking whether or not the I²C device is ready for communication.

Accordingly, after the resetting, the master device has no other way but accesses the slave device after spending a certain time period.

In the case of accessing the slave device without spending the certain time period described above after the master device sends a resetting signal, appropriate accessing cannot be implemented so that the slave device may malfunction. A minimum required time for the certain time period described above varies, depending on a circuit configuration. Therefore, a latency time in order to resume the slave device must be set according to an actual measured value, unfortunately after building an actual system. Moreover, the certain time period described above is set by way of adding a margin to the minimum required time in order to protect against incorrect operation, and therefore, it is impossible to prevent a useless latency time from coming up.

SUMMARY

At least an embodiment of the present invention provides an information processing device and a data communication method in which a latency time from either resetting or turning on the power supply until a start of communication is kept to the minimum necessary.

An information processing device according to at least an embodiment of the present invention includes a master device and at least one slave device, which are connected each other by using two types of signal lines; i.e., a serial clock line and a serial data line, wherein a datum is transmitted between the master device and the slave device according to a predetermined communication method by using the two types of signal lines; characterized in that; if either the master device resets the slave device, or a power supply to the master device and the slave device is turned on, the slave device commences a starting operation; and a notification of a starting condition is provided to the master device by way of at least one of the serial clock line and the serial data line.

A data communication method according to at least an embodiment of the present invention includes a datum transmission by a master device and a slave device, which are connected each other by using two types of signal lines; i.e., a serial clock line and a serial data line, by using the two types of signal lines according to a predetermined communication method; the improvement comprising; a step of commencing a starting operation by the slave device if either the master device resets the slave device, or a power supply to the master device and the slave device is turned on; a step of starting an initializing process at the time of start by the slave device, and notifying the master device of the starting condition by way of at least one of the serial clock line and the serial data line; and a step of enabling a start of a data communication by way of setting a port, to which the serial data line is connected, as an output port by the master device if the master device detects the initializing process having finished at the slave device according to the notification of the starting condition.

According to the configuration described above; receiving the notification of the starting condition, the master device can decide to start a data communication on the basis of the notification, and therefore a latency time from either a start of resetting or turning on the power supply until a start of the data communication is kept to the minimum necessary.

According to at least an embodiment of the present invention, provided can be an information processing device and a data communication method in which a latency time from either resetting or turning on the power supply until a start of communication is kept to the minimum necessary.

BRIEF DESCRIPTION OF THE DRAWINGS

Embodiments will now be described, by way of example only, with reference to the accompanying drawings which are meant to be exemplary, not limiting, and wherein like elements are numbered alike in several FIGS., in which.

DESCRIPTION OF THE PREFERRED EMBODIMENTS

Embodiments of the present invention are described below with reference to the accompanying drawings, using a case in which an 'information processing device' is an IC card reader/writer, as an example.

<1. First Embodiment>
(General Configuration)
FIG. 1 shows a general configuration (a system configuration) in which viewed at a center is an IC card reader/writer as an 'information processing device' according to an embodiment.

Figure 1:
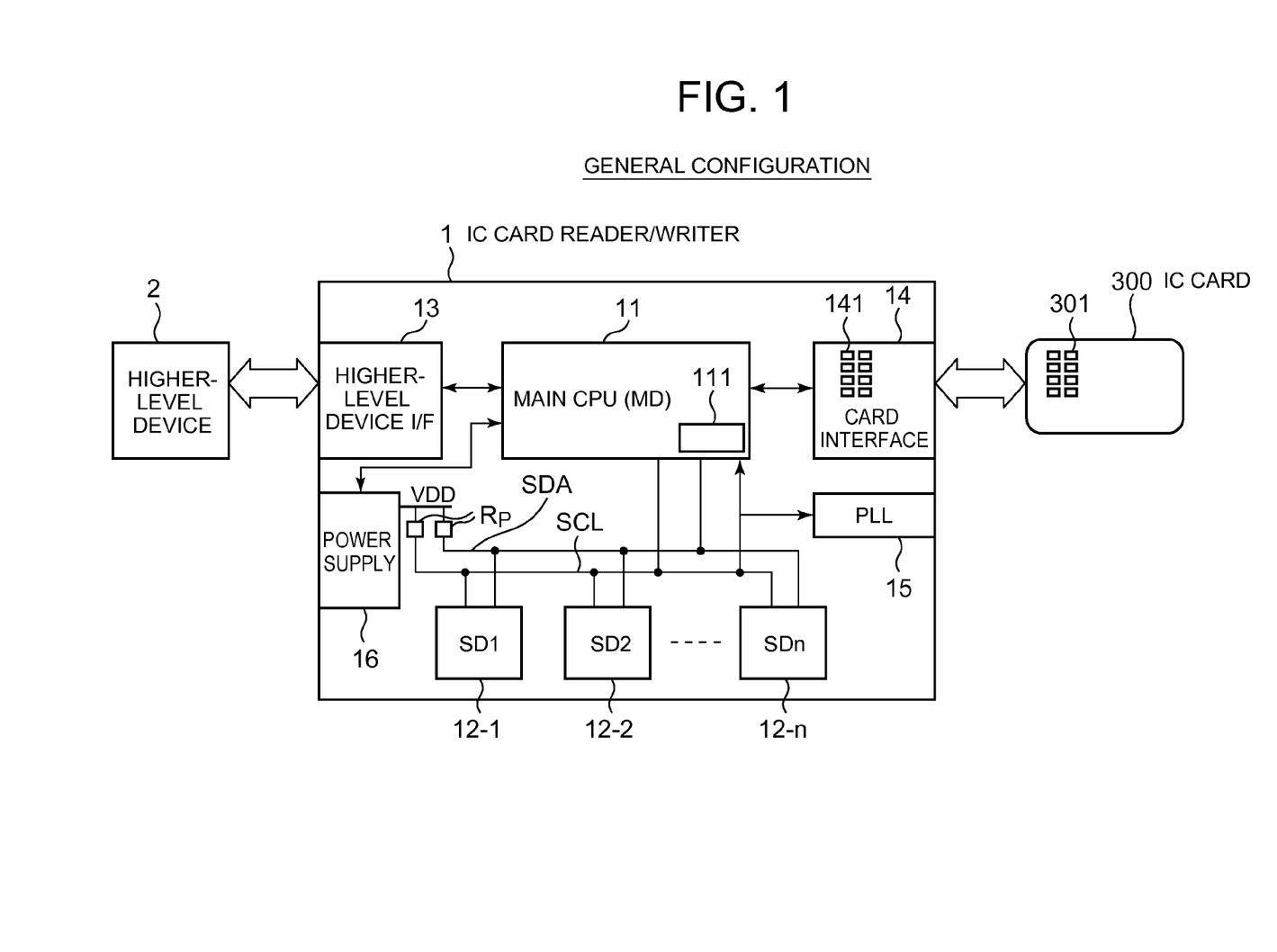
FIG. 1 is a system configuration diagram in which an IC card reader/writer is viewed at a center.

The system illustrated in FIG. 1 is so configured as to include an IC card reader/writer 1, a higher-level device 2, and an IC card 300.

The IC card reader/writer 1 is built in the higher-level device 2, which makes use of information of an IC card at the time of executing a function in response to a way of use. A cash dispenser, a ticket vending machine, an automatic vending machine, and the like can be named, for example, as the higher-level device 2.

The IC card reader/writer 1 has a configuration in which each function block is connected to a bidirectional bus with a simple structure including two types of signal lines. For example, an I²C bus is adopted as the bidirectional bus.

The I²C bus includes two types of signal lines; namely, a serial clock line SCL and a serial data line SDA, wherein each signal line is connected to a power supply line of a power supply voltage VDD through a pull-up resistor $R_P$. The power supply voltage VDD is supplied from a power supply circuit 16 built in the IC card reader/writer 1.

The IC card reader/writer 1 includes a main CPU 11 as a master device (MD), and at least one slave device (SD), named 12-1 through 12-n. Furthermore, the IC card reader/writer 1 includes a higher-level device interface (higher-level device I/F 13), a card interface (card I/F 14), a clock signal generating means (for example, a phase-locked loop (PLL) circuit 15), and a power-supply circuit 16. In this context, the main CPU 11 is an example of a "main processing device."

The higher-level device I/F 13 has a function for converting a signal, sent from the higher-level device 2 to the IC card reader/writer 1, into a signal having a predetermined level, and transmitting the converted signal to the main CPU 11. Moreover, the higher-level device I/F 13 inversely converts a signal coming from the main CPU 11, and transmits the signal converted inversely to the higher-level device 2. USB, RS232C, and the like are generally known as standards that specify a communication protocol between the higher-level device 2 and the IC card reader/writer 1.

The card I/F 14 converts a signal, coming from the main CPU 11, into a voltage level signal appropriate for the IC card 300, and sends the converted signal to the IC card 300. Moreover, the card I/F 14 has a function for inversely converting a signal received from the IC card 300 into a signal of a predetermined level, and transmitting the signal converted inversely to the main CPU 11.

Communication between the IC card reader/writer 1 and the IC card 300 is made in accordance with a predetermined communication protocol.

The card I/F 14 of the IC card reader/writer 1 has a card insertion port (a slot and the like) for the IC card 300.

Dimensions and a position of a terminal of the IC card 300 are specified in accordance with a predetermined protocol, and a group of contact terminals are so formed as to be exposed on one side of card surfaces.

In response to an arrangement of a terminal 301 of the IC card 300, a connection terminal 141 is provided inside the slot of the card I/F 14. Therefore, when the IC card 300 is inserted into the slot, the terminal 301 of the IC card 300 is connected to the connection terminal 141 one-to-one.

As shown in FIG. 1, the main CPU 11 as the 'master device (MD)' and at least one slave device (SD), named 12-1 through 12-n, are connected to the serial clock line SCL and the serial data line SDA. For the sake of convenience in relation to the illustration, slave devices (SDs) 12-1, 12-2, - - - 12-n are shown in FIG. 1. Incidentally, in the case of n=1, only the slave device 12-1 is included in the configuration; and meanwhile in the case of n=2, the slave devices 12-1 & 12-2 are included in the configuration.

In a configuration example shown in FIG. 1, the higher-level device I/F 13, the card I/F 14, the PLL circuit 15, and the power-supply circuit 16 are connected to the main CPU 11.

Incidentally, adopted can also be a configuration in which all of the higher-level device I/F 13, the card I/F 14, the PLL circuit 15, and the power-supply circuit 16 are connected, as a slave device (SD), to the serial data line SDA and the serial clock line SCL. In another way, some particular circuit such as the power-supply circuit 16, for example, may directly be connected to the main CPU 11, and meanwhile other circuits may be connected as a slave device (SD).

Also, the higher-level device I/F 13 and the card I/F 14 may be materialized as an on-chip interface of the main CPU 11; and in such a case, the higher-level device I/F 13 and the card I/F 14 are omitted in the block configuration.

The main CPU 11 is provided with a memory unit 111 including a ROM, a RAM, and so on. An operation program, an initial value, a parameter, and the like for the IC card reader/writer 1 are stored in the ROM. In the meantime, the RAM functions as a working area for the main CPU 11. Moreover, a 7-bit or 10-bit address in order to identify each slave device (SD) is stored in such a way as to be rewritable.

The main CPU 11 integrally controls the units connected to the main CPU 11; such as the higher-level device I/F 13, the card I/F 14, the PLL circuit 15, the power-supply circuit 16, an operation unit not shown in the figure, and so on. Furthermore, the main CPU 11 functions as the master device (MD) of the I$^2$C communication.

In the present embodiment, at least one of the slave devices (SDs) 12-1 to 12-n is a device that takes time for a process at the time of starting a micro-processing unit (MPU) and the like. The MPU also has a memory unit including a ROM, a RAM, and so on; and the memory unit stores an address of the MPU itself.

In this context, the MPU is an example of a "sub-processing device." While the function of the IC card reader/writer 1 is executed by way of a control of the main CPU 11, the MPU is a device for a control of changing the function or adding another function.

Accordingly, in the case of the IC card reader/writer 1 shown in FIG. 1, a function of the IC card reader/writer 1 can be added or the function of the same can be changed by way of adding an MPU complying with the I$^2$C communication standards, as required. Namely, the IC card reader/writer 1 has a simple configuration and high versatility, and furthermore includes a configuration that is prepared for flexibly adding a function in future, while keeping the main CPU, the bus, and the I/Fs of its elemental parts, as they are.

(Outline of Data Communication)

In this context, data communication between the master device (MD) and the slave device (SD) is briefly described.

Normally, a slave device (SD) designated with its address by a master device (MD) is allowed to communicate with the master device (MD). Concretely to describe, at first the master device (MD) sends out a control byte (CD) including an address and an R/W flag indicating a sending/receiving direction. Then, only a slave device (SD) designated with the address is allowed to communicate with the master device (MD).

Thereafter, when the master device (MD) sends out information such as a command, a datum, and the like, the information is sent out while an acknowledge signal being attached at an end of each byte (eight bits) as a "unit datum." Every time when receiving each byte, the slave device (SD) returns an acknowledge signal. Subsequently, when receiving the acknowledge signal, the master device (MD) sends out a next byte. Then, a series of these operation steps are repeated. For this system, though no restriction is placed with respect to the number of bytes that can be sent, data communication quits if the master device (MD) sets an ending condition.

(Processing at the Time of Starting Operation)

Next, processing at the time of resetting or turning on the power supply is briefly described.

At the time of resetting or turning on the power supply, an MPU as slave device (SD) executes an initializing process at first to reset its hardware and initialize an operation program (software). A time period of the initializing process varies in a range from several milliseconds to several ten-milliseconds, depending on a scale of the operation program of the MPU and a configuration of hardware.

In order to notify a master device (MD) of a clue to recognizing an end of the initializing process, the master device is notified of a starting condition from at least one of the serial clock line SCL and the serial data line SDA, after the slave device (SD) commences the starting operation.

The notification may be made by way of notifying that the initializing process has entered its final stage; namely, for example, an initializing process of software has started; or by way of notifying that the initializing process of software has finished so that all the initializing process has ended.

As a concrete embodiment of the notification, used may be either of an inverting operation of a signal level of either the serial clock line SCL or the serial data line SDA to lower the signal level from a stand-by condition (pull-up status) of a "High (H)" level (VDD level, hereinafter expressed as "H") down to a "Low (L)" level (for example, GND level, hereinafter expressed as "L"), and a re-inverting operation of the signal level after the inverting operation.

Incidentally, in the case of making a notification by way of either an inverting operation or a re-inverting operation with respect to a signal level of the serial clock line SCL, the serial data line SDA is in its stand-by condition (pull-up status) of the "H" level (VDD level). In the same manner, in the case of making a notification by way of either an inverting operation or a re-inverting operation with respect to a signal level of the serial data line SDA, the serial clock line SCL is in its stand-by condition (pull-up status) of the "H" level (VDD level).

Incidentally, in the I$^2$C communication, it is specified as a starting condition for normal data communication that 'when the signal level of the serial clock line SCL is "H", the signal level of the serial data line SDA is shifted from "H" to "L".' On the other hand, it is specified as an ending condition for normal data communication that 'when the signal level of the serial clock line SCL is "H", the signal level of the serial data line SDA is shifted from "L" to "H".'

Apparently, a notification by way of either an inverting operation or a re-inverting operation with respect to the signal level of the serial data line SDA cannot be distinguished from the starting condition and the ending condition described above.

Nevertheless, the starting condition and the ending condition are created essentially by the master device (MD), while a notification is created by the slave device (SD), and therefore the starting condition & ending condition and notifications are different from each other from that viewpoint. Accordingly, if the master device (MD) detects either inverting or re-inverting of a signal level of the serial data line SDA in spite of no creation of the starting condition & ending condition by the master device (MD) itself, it can be recognized to be a 'notification of the starting condition' from the slave device (SD). Moreover, a distinction can also be made from a viewpoint with respect to a time-wise consideration. In other words, while the starting condition & ending condition are a change in electrical potential in the serial data line SDA, which occurs after the master device (MD) judges that data communication is able to start; in the case where a change in the signal level being the same as the starting condition & ending condition is detected in a time period of starting operation before the change in electrical potential, it can be recognized to be a 'notification of the starting condition' from the slave device (SD).

In the meantime, a 'notification of the starting condition' may be made by using both the serial clock line SCL and the serial data line SDA.

For example, in the I²C communication, it is not allowed to make a change in electrical potential in the serial data line SDA, while a signal level of the serial clock line SCL is "H." Making use of this restriction, a 'notification of the starting condition' can be made by way of inverting a signal level of the serial data line SDA "from H to L" and further re-inverting "from L to H" while a signal level of the serial clock line SCL is "L."

In another way, contrarily a 'notification of the starting condition' can be made by way of inverting a signal level of the serial clock line SCL "from H to L" and further re-inverting "from L to H" while a signal level of the serial data line SDA is "L."

As described above, in at least an embodiment, the slave device (SD) notifies the master device (MD) of a starting condition of the slave device (SD) itself through at least one of the serial clock line SCL and the serial data line SDA.'

Receiving 'either inverting or re-inverting in a signal line level' having any one of the embodiments mentioned above from the slave device (SD), the master device (MD) recognizes it to be a 'notification of the starting condition.'

In this way, the master device (MD) can become aware of a time for being able to start normal data communication. Specifically, if the 'notification of the starting condition' means an 'end of all the initializing process', data communication can immediately get started. In the meantime, if the 'notification of the starting condition' means something to notify of an 'interim step in the initializing process (for example, a start of a final step in the initializing process)', the notification makes it possible to roughly calculate how much time still remains before the end of all the initializing process.

Thus, the master device (MD) can become aware of a time for the end of all the initializing process, according to the notification, and therefore a useless latency time can be reduced as much as possible in such a way that data communication can smoothly get started.

Specific contents of the initializing process, timing of the notification, switching of I/O ports, and the like are described in a second embodiment, as a more concrete embodiment, mentioned next.

<2. Second Embodiment>

While the first embodiment above describes an outline of the general configuration, the second embodiment mentioned next explains a concrete example more in detail; in which the slave device (SD) is a secure MPU, and the secure MPU is additionally mounted on an optional board of an IC card reader/writer.

An I²C device is placed on the market, as an IC in which a core function for communication (a function for executing communication) is designed and embedded by a manufacturer of the device. A purchaser of the I²C device mounts the I²C device on a board.

When an IC card reader/writer 1 is manufactured, the board on which the I²C device is mounted is placed in the IC card reader/writer 1. Next the I²C device is connected to an IC that works as a counterpart in communication; for example, such as a main CPU; so as to enable the I²C communication. Then, the I²C communication protocol (communication procedures) is installed by using installation software of the main CPU, in order to make it possible to access the I²C device according to the procedures.

By an installation of this kind of additional configuration into the IC card reader/writer 1, a function that the main CPU itself does not originally have can be annexed with the I²C device that can carry out I²C communication. Therefore, the information processing device as a whole can work as a more sophisticated system.

(Block Configuration for I²C Communication)

Figure 2:
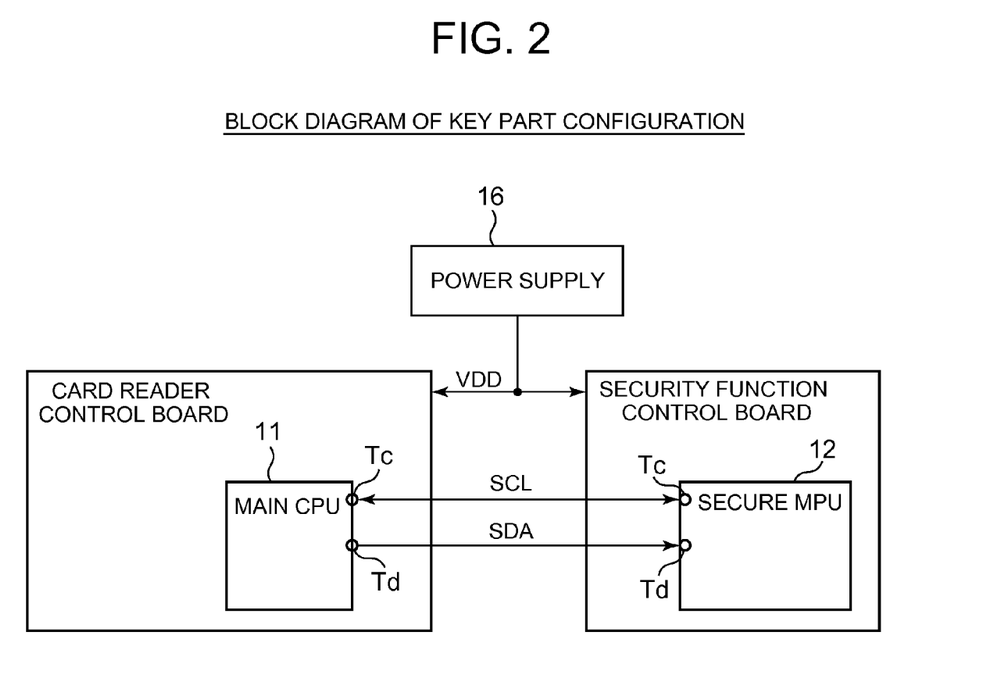
FIG. 2 is a connection diagram of a secure MPU and a main CPU that are mounted on a substrate, and are built in an IC card reader/writer.

FIG. 2 is a connection diagram of the secure MPU and the main CPU that are mounted on a substrate, and are built in the IC card reader/writer.

A main CPU 11 as a master device (MD) is mounted on a card reader control board. Being mounted on a security function control board, a secure MPU 12 as a slave device (SD) is placed in the IC card reader/writer 1. Clock terminals Tc of the main CPU 11 and the secure MPU 12 are connected each other with a serial clock line SCL. Meanwhile, data terminals Td of the main CPU 11 and the secure MPU 12 are connected each other with a serial data line SDA.

The card reader control board and the security function control board are supplied with a power supply voltage VDD out of a power-supply circuit 16 (refer to FIG. 1). Then, the main CPU 11 and the secure MPU 12 operate with the power supply voltage VDD.

Having a security function of protection against unauthorized external reading and writing from/to an internal memory unit, the secure MPU 12 is so configured as to become able to take every possible measure for security protection. For example, the secure MPU 12 can store an identification datum, a personal datum, and/or a verification datum for checking in relation to the above data, in order to enhance security against a leak of information.

Furthermore, if the secure MPU 12 is a cryptographic operation device, a system including enhanced security against a leak of information can be materialized by way of adding a cryptographic function to disable external identification of an operation result and the like.

(Configuration and Operation of I/O Ports)

Figure 3:
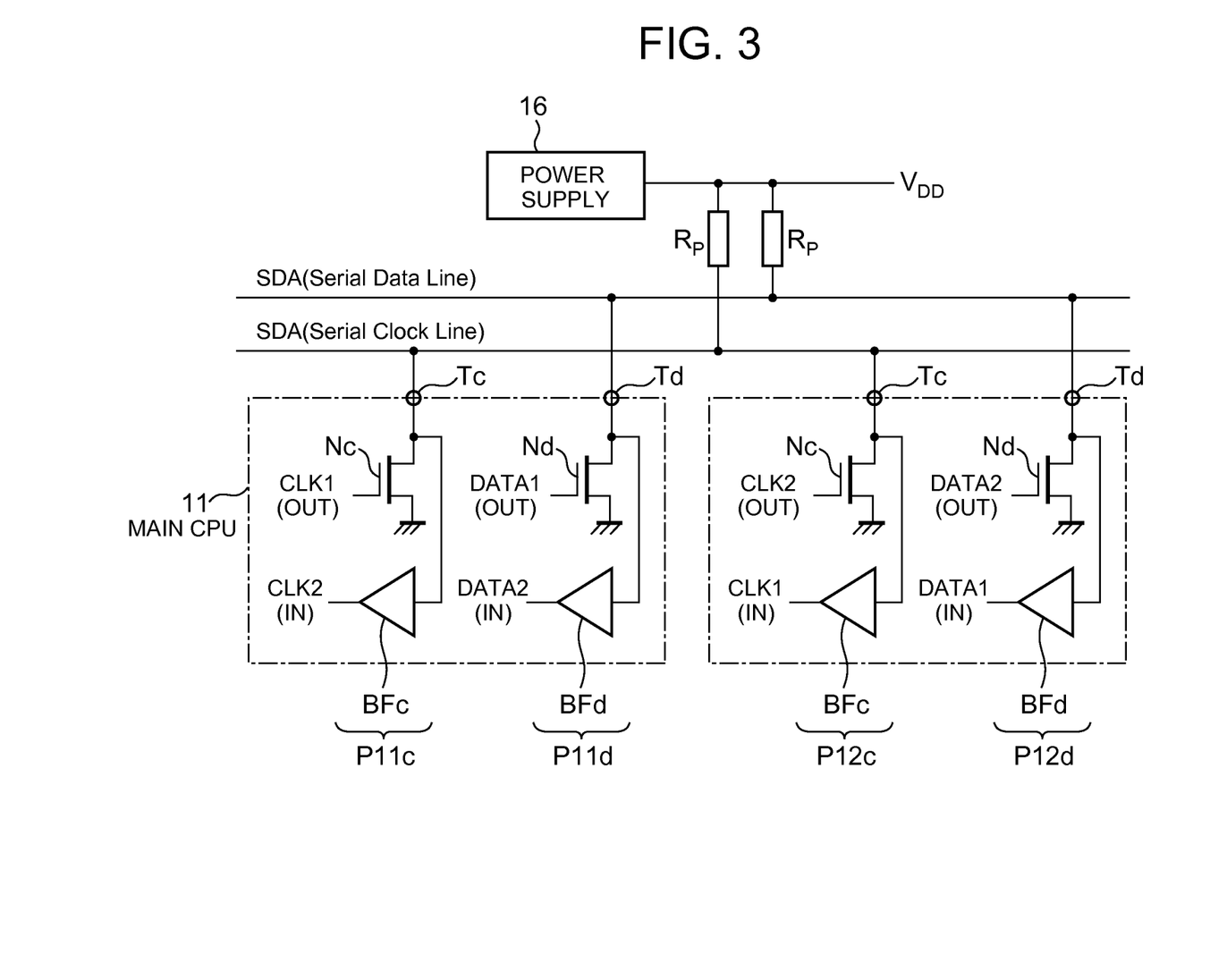
FIG. 3 is a diagram showing an I/O port configuration of a main CPU and a secure MPU for performing the I²C communication.

FIG. 3 shows an I/O port configuration of the main CPU and the secure MPU for performing the I²C communication.

The main CPU 11 and the secure MPU 12 individually have an I/O port, including an NMOS transistor and a buffer circuit, at each of a clock terminal Tc and a data terminal Td.

A serial clock line SCL is connected to a clock terminal Tc of the main CPU 11. An NMOS transistor Nc of a clock I/O port P11c is connected between the clock terminal Tc and a supply line of a grounding potential. An input of a clock buffer circuit BFc is connected to the clock terminal Tc.

A serial data line SDA is connected to a data terminal Td of the main CPU 11. An NMOS transistor Nd of a data I/O port P11d is connected between the data terminal Td and a supply line of the grounding potential. An input of a data buffer circuit BFd is connected to the data terminal Td.

Also in the secure MPU 12, a clock I/O port P12c having the same configuration as the clock I/O port P11c described above is provided, being connected to a clock terminal Tc. Moreover, a data I/O port P12d having the same configuration as the data I/O port P11d described above is provided, being connected to a data terminal Td.

In this context, a basic concept is a fact that the main CPU 11 is a master device (MD), and the secure MPU 12 is a slave device (SD). In this case, the main CPU 11 plays a leading role in data communication in synchronization with a clock signal CLK1 generated in the PLL circuit 15 (See FIG. 1).

Incidentally, a multi-master-device operation can be carried out in the I²C communication, and therefore sometimes a relationship of the master device (MD) and the slave device (SD) may temporarily be replaced each other. In other words, the secure MPU 12 can play a leading role in data communication in synchronization with a clock signal CLK2 coming from a PLL circuit that is not shown in the drawing but provided in the security function control board. In this case, the secure MPU 12 temporarily works as a master device (MD).

As shown in FIG. 3; a clock signal CLK1 (OUT), generated in the PLL circuit 15 (See FIG. 1) and supplied through the main CPU 11, can be applied to a gate of the NMOS transistor Nc of the clock I/O port P11c. Meanwhile, a data signal DATA1 (OUT) supplied from the main CPU 11 can be applied to a gate of the NMOS transistor Nd of the data I/O port P11d.

Furthermore, in order to become able to cope with a multi-master-device operation as described above; a clock signal CLK2 (OUT), generated in a PLL circuit not shown and supplied through the secure MPU 12, can be applied to a gate of the NMOS transistor Nc of the clock I/O port P12c. Meanwhile, a data signal DATA2 (OUT) supplied from the secure MPU 12 can be applied to a gate of the NMOS transistor Nd of the data I/O port P12d.

When the main CPU 11 delivers a clock signal, an impedance between an input and an output in its clock buffer circuit BFc is high so as to result in an OFF status, and the NMOS transistor Nc is activated with open drain under the condition. Accordingly, the clock signal CLK1 (OUT) is output and transmitted into the serial clock line SCL. A setting of turning OFF the buffer circuit in this way to activate the NMOS transistor under the open-drain status is called "setting as an output port."

In the meantime, the I/O port at a side of the data terminal Td is also set as an output port, so that the data signal DATA1 (OUT) internally synchronized with the clock signal CLK1 (OUT) is output and transmitted into the serial data line SDA.

Meanwhile at the time, two I/O ports are set as input ports in advance at a side of the secure MPU 12. In this context, "to set as an input port" means a condition in which a gate of the NMOS transistor is fixed to be "L" in such a way as to be in an OFF status (i.e., a high-impedance status), and then the buffer circuit is in an ON status so as to become able to accept an input and output it. Therefore, the clock signal CLK1 (OUT) coming up as a transmitted signal is taken into the secure MPU 12 as a clock signal CLK1 (IN), and meanwhile the data signal DATA1 (OUT) coming up as a transmitted signal is taken into the secure MPU 12 as a data signal DATA1 (IN).

Incidentally, to have the secure MPU 12 carry out data communication, settings of the ports and transmission directions of the clock signal and the data signal are opposite to those described above.

(Fundamentals of Data Communication)

Fundamental operations of data communication in the I²C communication are described below with reference to FIG. 4.

FIG. 4A shows a waveform of a data signal DATA1 that the main CPU 11 (See FIG. 3) delivers. FIG. 4B shows a waveform of an operation of the secure MPU 12 (See FIG. 3) to return an acknowledge signal. Since being a change in a signal level of the serial data line from the side of the secure MPU 12, this response of an acknowledge signal is a kind of data signal DATA2 shown in FIG. 3. FIG. 4C shows a waveform of a clock signal CLK1 that is output from the main CPU 11.

Under steady state condition either in initial communication or out of communication, the main CPU 11 is set as an output port, and the secure MPU 12 is set as an input port.

Figure 4:
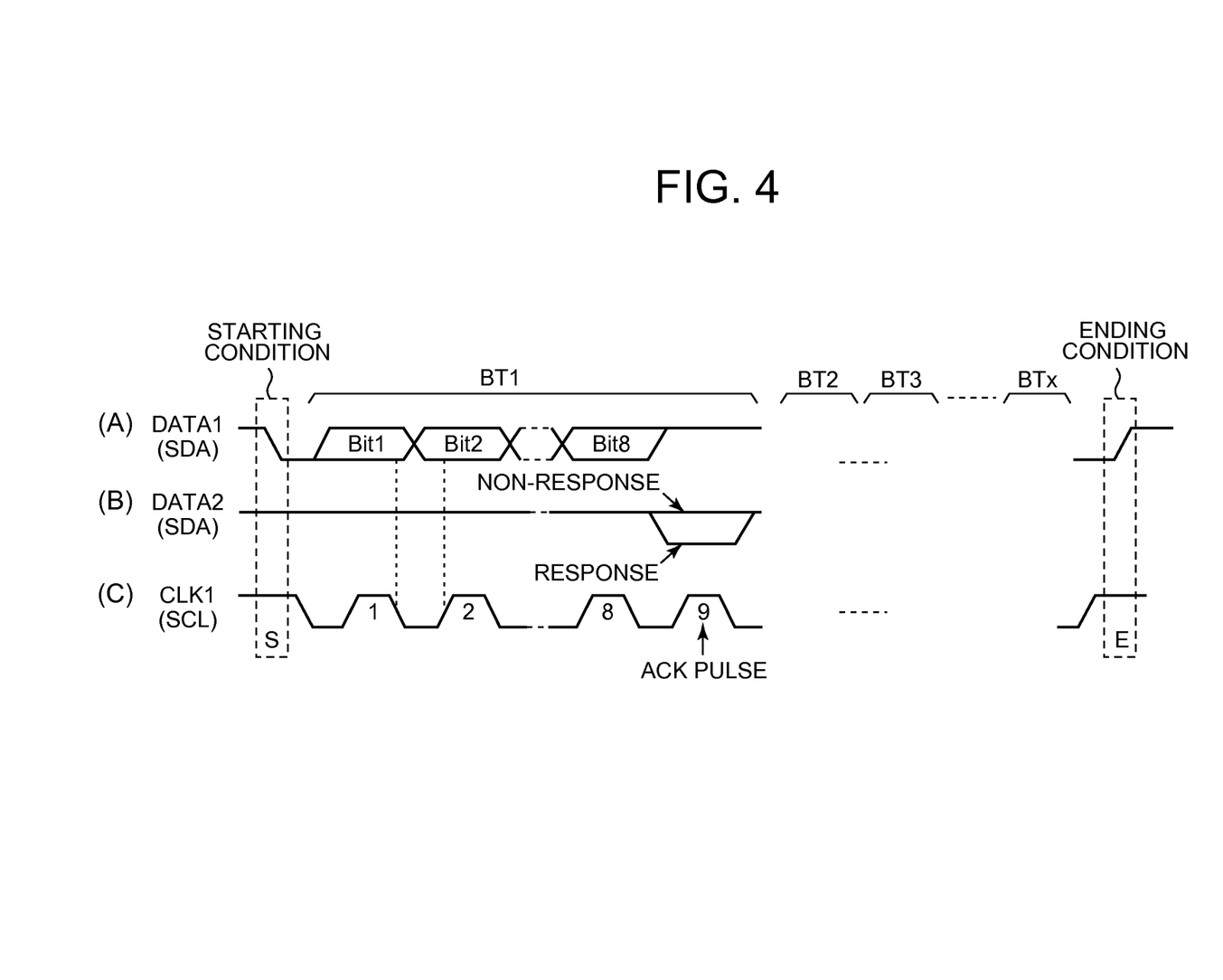
FIG. 4 is a waveform diagram of a data signal, an acknowledge signal, and a clock signal under the I²C communication.

As shown in FIG. 4, a starting condition for the I²C data communication is that 'when a signal level of a serial clock line SCL (i.e., CLK1 in this case) is "H", a signal level of a serial data line SDA (i.e., DATA1 in this case) is shifted from "H" to "L".' Then, in the case where the secure MPU 12 is set as an output port for some reason, the secure MPU 12 detects the starting condition to be immediately set as an input port.

After the starting condition is delivered, a first one byte datum (BT1) is delivered from the main CPU 11. In the I²C communication, it is specified that bit reversing in the byte datum including eight bits is carried out when the clock signal is "L" condition, and then data transmission is conducted in synchronization with the clock signal. With respect to an acknowledge signal, a ninth clock pulse just after the byte datum is used as an ACK pulse. Counting clock pulses of the clock signal CLK1 (IN) coming in by using a circulation counter and the like, the secure MPU 12 recognizes the ninth as an ACK pulse. Then, just after receiving an eighth-bit datum, the secure MPU 12 temporarily switches its setting from being as an input port to being as an output port, and moreover temporarily lowers a signal level of the serial data line SDA from "H" to "L" to return the condition as a response of the acknowledge signal to a side of the main CPU 11.

After delivering the byte datum, the main CPU 11 switches its setting to being as an input port in advance, so that if the response of the acknowledge signal is given, the main CPU 11 recognizes that the byte data has successfully been received by the secure MPU 12. Then, the main CPU 11 delivers a following second byte datum (BT2) in the same manner. Meanwhile, the secure MPU 12 responses to the acknowledge signal (ACK pulse), in the same way as it has done at the time of receiving the first byte datum.

Subsequently, the same procedures are repeated for a third byte datum (BT3), - - -, in the same way. Then, after transmission of a last byte datum (BTx), the main CPU 11 sets an ending condition in such a way that the data communication finishes. In this context, an ending condition in the I²C data communication is that 'when a signal level of a serial clock line SCL (i.e., CLK1 in this case) is "H", a signal level of a serial data line SDA (i.e., DATA1 in this case) is shifted from "L" to "H".' When detecting the ending condition, the secure MPU 12 becomes ready to start internal processing by using a received datum.

In order to have the secure MPU 12 execute a predetermined process, the main CPU 11 operates in such a way as described below.

At first, a control byte (CB) is sent out from the main CPU 11. The control byte includes a slave address and an R/W flag for discriminating between writing and reading with respect to a datum. In the case of having the secure MPU 12 execute a process, the operation includes transmission of a datum, required for the objective process, to the secure MPU 12. Therefore, the R/W flag designates "Write."

If the main CPU 11 transmits a slave address of the secure MPU 12 as a control byte, the secure MPU 12 is allowed to communicate with the main CPU 11. The main CPU 11 sequentially transmits: a command code, a parameter code describing details of the command code, and other data required for the process (which may not be necessary, depending on the process contents); as byte data subsequent to the control byte.

If the secure MPU 12 detects the R/W flag to recognize it as 'writing a datum' (i.e., 'receiving the datum' in relation to the secure MPU 12), the secure MPU 12 determines a process to be carried out, on the basis of the command code and the parameter code, which have been received, and then carries out the process. Incidentally, in the case where other data required for the process is delivered, the secure MPU 12 takes in the data, and then carries out the process.

(Operation at the Time of Resetting)

Being based on the premise described above, a data communication method including an operation at the time of resetting, which is a feature of the present embodiment, is described below with reference to the drawings. Incidentally, with respect to an operation at the time of turning on the power, a difference in comparison with the operation at the time of resetting is described later.

Figure 5:
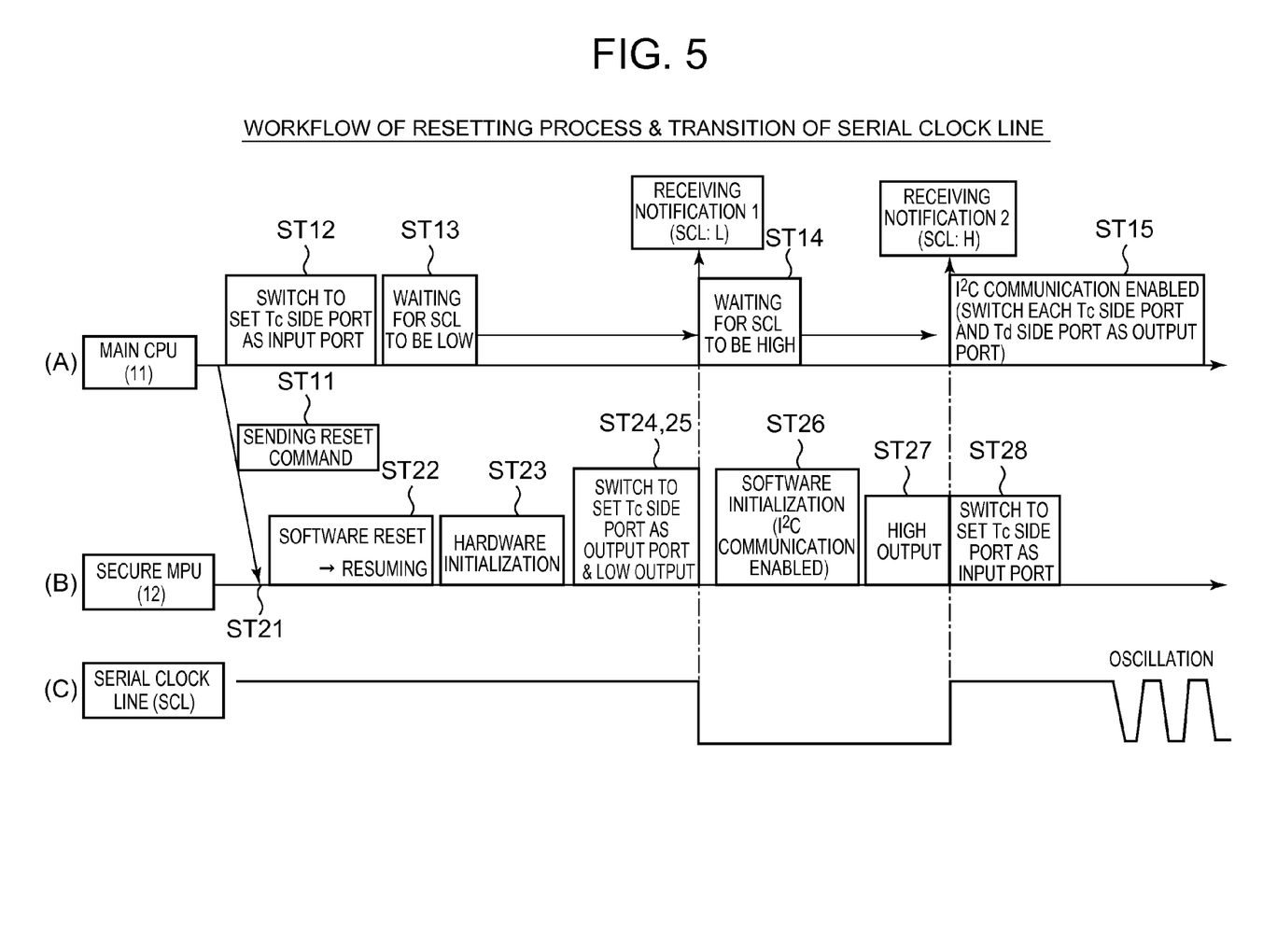
FIG. 5 is a diagram in which processing steps at the time of resetting are shown, being arranged in chronological order.
Figure 6:
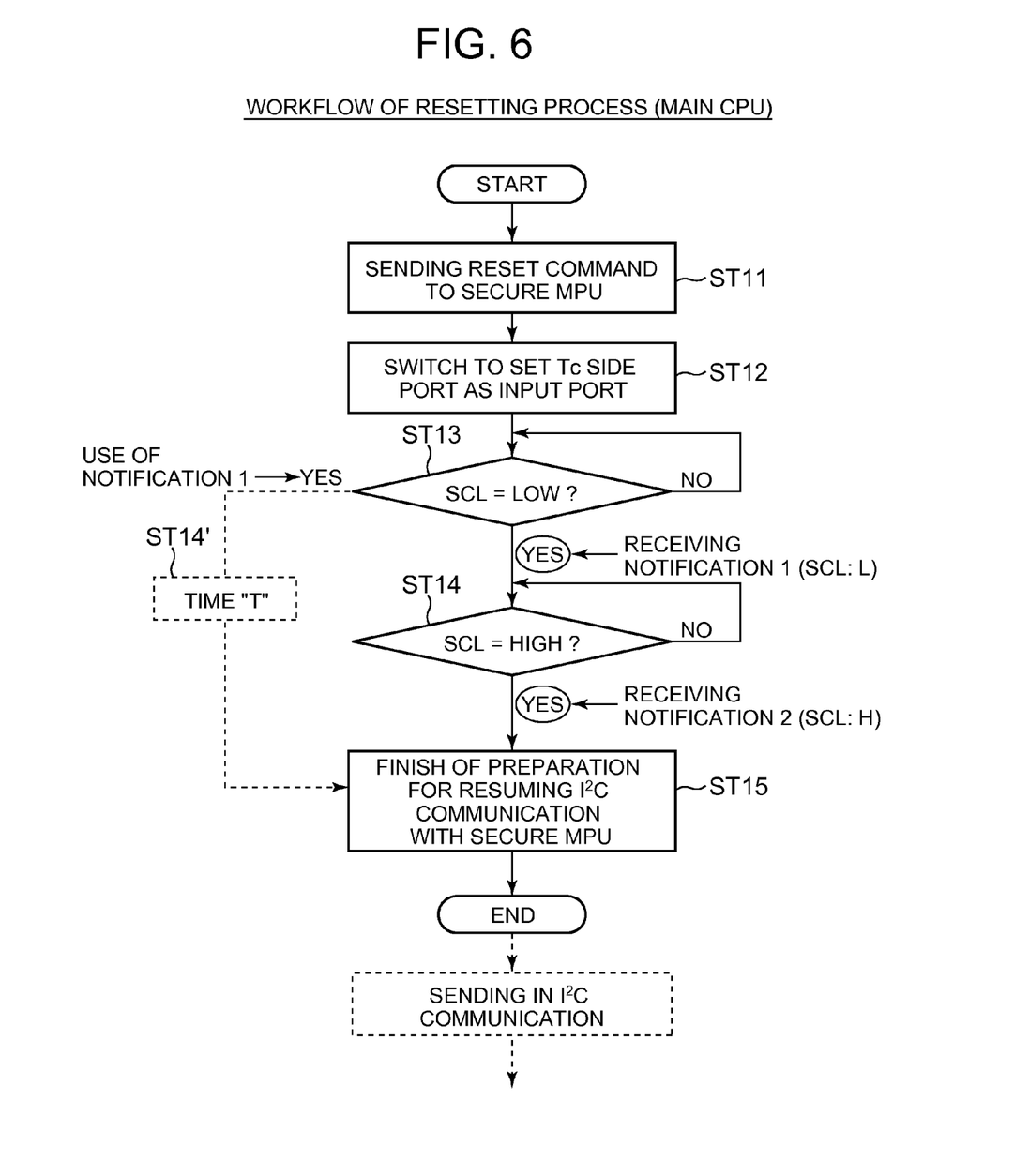
FIG. 6 is a flowchart of processing steps out of those shown in FIG. 5, which are executed by the main CPU.
Figure 7:
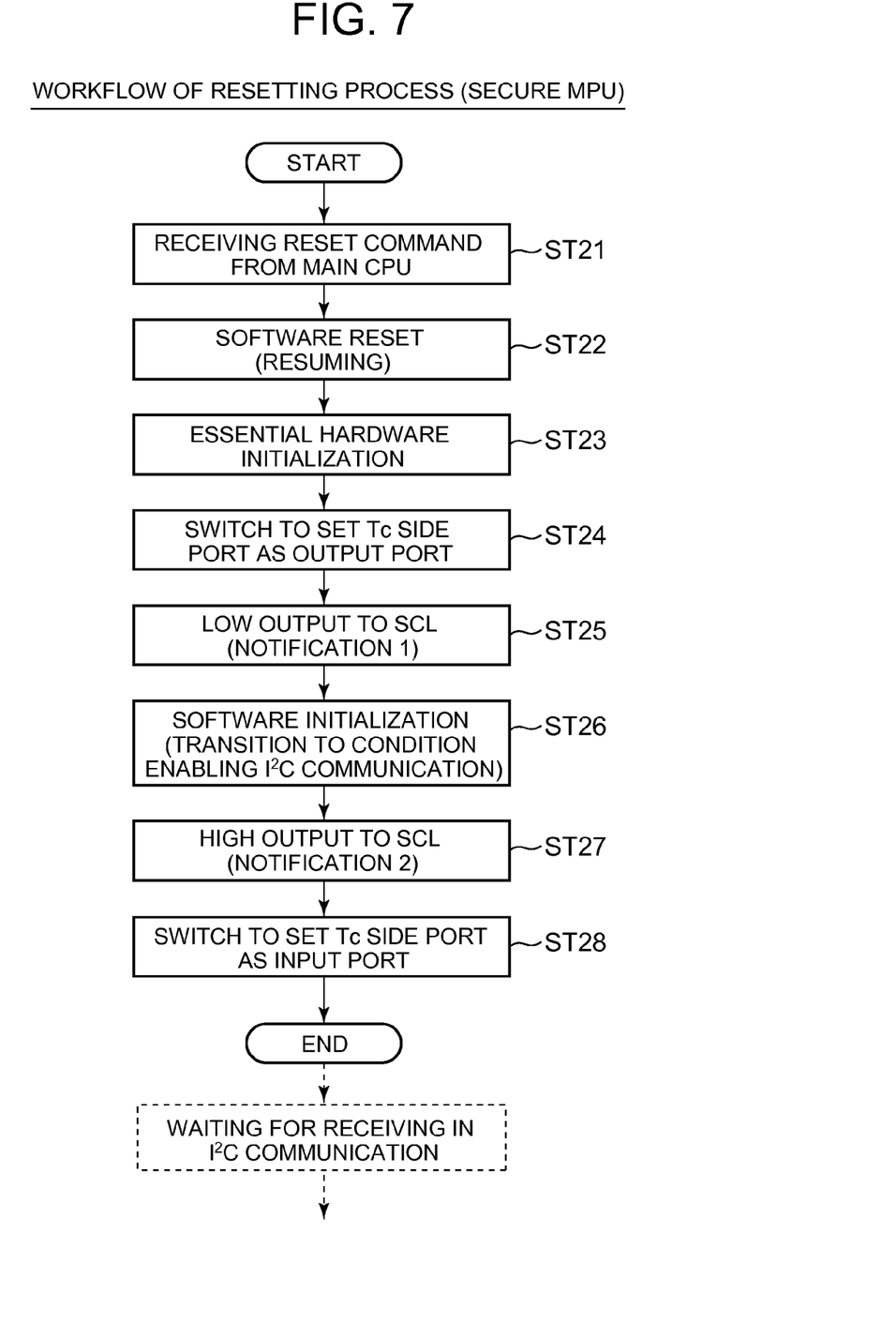
FIG. 7 is a flowchart of processing steps out of those shown in FIG. 5, which are executed by the secure MPU.

FIG. 5 is a diagram in which processing steps at the time of resetting are shown, being arranged in chronological order. FIG. 6 is a flowchart of processing steps out of those shown in FIG. 5, which are executed by the main CPU. FIG. 7 is a flowchart of processing steps out of those shown in FIG. 5, which are executed by the secure MPU. In FIGS. 5, 6, and 7, a step in common is shown with the same symbol.

Incidentally, FIGS. 5 through 7 illustrate steps of executing a 'notification of the starting condition', which is transmitted from the secure MPU 12 to the main CPU 11, by using the serial clock line SCL.

As shown in FIG. 5A and FIG. 5B, at first the main CPU 11 transmits a reset command to the secure MPU 12 (ST11).

The transmission of the reset command is carried out according to the method of transmitting each byte, already explained with reference to FIG. 4. Therefore, at the time of receiving the reset command, the secure MPU 12 returns an acknowledge signal (ACK pulse), and meanwhile the main CPU 11 becomes aware with the ACK pulse that the reset command has successfully been transmitted.

After transmitting the reset command, the main CPU 11 implements a switching operation of "setting as an input port" for an I/O port at a side of the clock terminal Tc, as shown in FIG. 6 (ST12). Accordingly, a state of waiting for a notification 1 is provided. In this context, the 'state of waiting for the notification 1' means a state of watching for the serial clock line SCL to shift from its steady state condition "H (High)" to "L (Low)" (the notification 1). In FIG. 6, Step ST13 shows the state of waiting for the notification 1.

In the meantime, after receiving the reset command (ST21), the secure MPU 12 restarts software (ST22) in order to carry out a software resetting process, as shown in FIG. 7. In this context, 'restarting software' means returning a software execution process forcibly to its initial condition to get back to a top of the workflow. According to this operation, every parameter and so on are also initialized, and temporarily saved data such as a register and the like, used in the middle of the process, are also initialized (for example, deleted).

Next, the secure MPU 12 executes an initializing process on essential hardware (ST23). For example, initialized is an on-chip interface (I/F) included in the secure MPU 12; and furthermore, if a memory unit and the like are connected to the secure MPU 12, these elements stop their operation and initialize themselves so as to get into waiting condition under which these elements are accessible.

As the hardware initialization finishes, the secure MPU 12 implements a switching operation of "setting as an output port" for an I/O port at a side of the clock terminal Tc (ST24), and makes the notification 1 (ST25). According to this operation, a signal level of the serial clock line SCL is inverted from "H" to "L", and the inverted signal level (i.e., the notification 1) propagates through the serial clock line SCL to reach the main CPU 11.

The main CPU 11 in the state of waiting for the notification 1, as shown in FIG. 6, detects the inverted signal level in the serial clock line SCL to recognize that the notification 1 has been given, and then the step ST13 results in "YES."

Then, in the process flow, operation moves to a next step ST14; and provided at the time is a state of waiting for the signal level of the serial clock line SCL being re-inverted (from "L" to "H"), as a notification 2.

In the meantime, with an explanation being returned to FIG. 7, the secure MPU 12 executes an initializing process on software, after outputting the notification 1 (ST25). Contents of the process include executing the I²C protocol from a top of the software until a step where the I²C communication becomes ready.

When the initializing process on software finishes, the secure MPU 12 outputs the notification 2 (re-inverting the signal level of the serial clock line SCL from "L" to "H") from the clock terminal Tc set as an output port (ST27).

Being in the state of waiting for the notification 2 in FIG. 6, the main CPU 11 detects the signal level of the serial clock line SCL having been re-inverted, so as to recognize that the notification 2 is presented. Then, the step ST14 results in "YES."

Accordingly, the process flow progresses to a next step ST15. At the step ST15, the main CPU 11 switches each I/O port at the side of the clock terminal Tc and the data terminal Td to set it as an output port, and finishes preparation for resuming the I²C communication. The starting operation itself at the time of resetting ends up at this point.

Subsequently, the main CPU 11 oscillates the clock signal to resume the I²C communication at an optional timing that main CPU 11 determines.

Meanwhile, in the secure MPU 12, the I/O port at the side of the clock terminal Tc is switched so as to be set as an input port after outputting the identification 2 (ST27), as shown in FIG. 7, to end up the starting operation at the time of resetting. Then, provided at the time is a state of waiting for receiving a signal in the I²C communication in which the main CPU 11 plays a leading role.

As explained with reference to FIG. 4, the I²C communication is a serial communication that is carried out while verifying if a right transmission is done for each byte, by watching an ACK pulse response.

(Operation at the Time of Turning on the Power)

In the operation at the time of turning on the power, there exists neither the step ST11 for sending a reset command, shown in FIGS. 5 and 6, nor the step ST21 for receiving a reset command, shown in FIG. 7.

When the power of the IC card reader/writer 1 is turned on, both the main CPU 11 and the secure MPU 12 commence the starting operation at the same time.

Concrete process steps to be carried out by the secure MPU 12 at the time of start; i.e., the software resetting (resuming) process of the step ST22, the hardware initializing process of the step ST23, and the software initializing process of the step ST26; also get started in the main CPU 11 as well concurrently with the start.

Except this point, the operation is the same as that to be carried out at the time of resetting, as shown in FIGS. 5 through 7, and already explained.

Incidentally, applied may be another configuration in which the secure MPU 12 commences its starting operation after the main CPU 11 commences the starting operation. For example, applied may be a configuration in which the secure MPU 12 commences its starting operation after the main CPU 11 becomes able to watch for the serial clock line SCL to shift into LOW. For more detailed example, a circuit may be configured in such a way that the main CPU 11 can control the starting operation of the secure MPU 12; such that, when the main CPU 11 becomes able to watch for the serial clock line SCL to shift into LOW (ST13), the main CPU 11 operates the circuit in order to start the secure MPU 12.

As described above, in the second embodiment, the main CPU 11 makes it possible to start the communication on the basis of the notification 2 (re-inverting the signal level of the serial clock line SCL), and therefore the useless latency time from either resetting or turning on the power to the start of communication is reduced to almost zero so as to materialize a smooth start of communication.

Incidentally, this effect is also achieved in the first embodiment as well.

Described next are modifications of the first embodiment and the second embodiment.

(Modification 1)

In the above explanation with reference to FIG. 5 through FIG. 7, the main CPU 11 makes it possible to start the communication on the basis of the notification 2 (re-inverting the signal level of the serial clock line SCL).

In the meantime, a modification can be made in such a way that the main CPU 11 makes it possible to start the communication on the basis of the notification 1 (inverting the signal level of the serial clock line SCL).

Concretely to describe, as a workflow shown with a dashed line in FIG. 6; having received the notification 1 at the step ST13 and spending a certain time "T"(ST14'), the main CPU 11 may make it possible to start the communication (ST15).

With respect to the hardware initializing process and the like, shown in FIG. 5, the process time varies according to a difference in its hardware configuration. On the other hand, the software initializing process (ST26) occurs in an execution time period until the start of communication according to the I²C protocol. Accordingly, though there exists somewhat an influence of a difference in the MPU's operation speed and the like, the software initializing process does vary less in its time period than the hardware initializing process. Therefore, the time period "T", which extends after receiving the notification 1 until the communication becomes able to start, can be predicted almost accurately. Then, even such a method according to a notification in the middle of the resetting process makes a profit of significantly reducing the latency time, in comparison with a conventional method in which a latency time is measured according to the reset command.

(Modification 2)

In the same manner as described in the first embodiment, it is also possible in the second embodiment to use a change in the signal level of the serial data line SDA, or a combination of the signal levels of the serial clock line SCL and the serial data line SDA, as a 'notification of the starting condition.'

(Modification 3)

In the second embodiment, the secure MPU 12 is software-reset according to a reset command transmitted by way of the I²C communication.

Meanwhile, with a dedicated resetting line to be optionally provided and to be watched by a slave device (SD), the software resetting may be carried out when it is judged that a resetting operation has been requested.

In another modification, with a dedicated resetting line to be optionally provided, the hardware may forcibly be reset when it is judged that a slave device (SD) has received a request on a resetting operation.

(Modification 4)

Though being used for the I²C communication is preferable, the technology that the present application discloses may be widely used for any other serial communication. A configuration of I/O ports for the I²C communication is not limited to what FIG. 3 shows. The transistor and the buffer circuit are not limited to an NMOS configuration, but any of a CMOS configuration, a bi-polar configuration, and a bi-CMOS configuration may be applied.

Furthermore, the information processing device is not limited to an IC card reader/writer.

The first embodiment and the second embodiment, as well as the modification 1 through the modification 4, described above, bring about the following effects.

According to the first embodiment, and the data communication method in relation to the second embodiment shown with reference to FIG. 5 through FIG. 7, a latency time from either resetting or turning on the power supply until a start of communication can be kept to the minimum necessary.

This effect becomes more significant in the case where a lot of slave devices (SDs) exist, as shown in the first embodiment, and a plurality of slave devices among them are MPUs and the like that take time for a starting operation.

Namely, in the case where exist a lot of slave devices (SDs) and a plurality of MPUs exist, an effect of delayed processing of a slave device having a great load intricately affects on other slave devices so that it becomes difficult to estimate a starting operation time that is most time-consuming. Therefore, a great time margin is needed for the latency time until the start of communication as well. Even in such a case, by way of applying this technology disclosed herein, the start of communication can be implemented according to the starting operation time that is most time-consuming. Accordingly, the time margin can be reduced to almost zero, or it can be drastically reduced.

A combination with the I²C communication leads to an effect as described next.

By means of the serial clock line SCL and the serial data line SDA to be used for the I²C communication control, but without any other line, a master device (MD) can figure out a starting condition of a slave device (SD). Therefore, though having a very simple circuit configuration, an information processing device of the slave-and-master-device type, which is highly reliable on communication with a slave device (SD), can be materialized.

Furthermore, in the second embodiment, the secure MPU 12, as a slave device, being provided with a security function is connected by way of the I²C communication to the main CPU 11 of the card reader, as a master device (MD).

Under normal circumstances, a ready-made device such as an EEPROM is connected as a slave device (SD), and therefore no change can be made with respect to a control of a communication line and a resetting control.

Nevertheless, as described in the second embodiment, if a slave device (SD) is an MPU, a flexible manipulation can be done with respect to a control of a communication line and a resetting control, since a designer for a firmware of the MPU is able to collectively carry out programming work for the secure MPU.

Accordingly, it is easy to apply the above-described data communication method, in which a latency time until a start of communication is kept to the minimum necessary, to the I²C communication; and therefore, an increase in cost due to a design change is advantageously limited.

While the description above refers to particular embodiments of the present invention, it will be understood that many modifications may be made without departing from the spirit thereof. The accompanying claims are intended to cover such modifications as would fall within the true scope and spirit of the present invention.

The presently disclosed embodiments are therefore to be considered in all respects as illustrative and not restrictive, the scope of the invention being indicated by the appended claims, rather than the foregoing description, and all changes which come within the meaning and range of equivalency of the claims are therefore intended to be embraced therein.

What is claimed is:

1. An information processing device comprising:
a master device; and
at least one slave device;
wherein the master device and the at least one slave device are connected to each other by using two types of signal lines comprising a serial clock line and a serial data line,
wherein a datum is transmitted between the master device and the slave device according to a predetermined communication method by using the two types of signal lines,
wherein if either the master device resets the slave device, or a power supply to the master device and the slave device is turned on, the slave device commences a starting operation; and
wherein a notification of a starting condition is provided to the master device by way of at least one of the serial clock line and the serial data line.

2. The information processing device according to claim 1;
wherein the predetermined communication method is a serial communication method in which the master device has a key role; and
the master device and slave device are configured such that:
the master device outputs a predetermined unit datum into the serial data line in synchronization with a clock signal that is output into the serial clock line;
the slave device having received the unit datum outputs an answer signal into the serial data line; and
having received the answer signal, the master device outputs a predetermined unit data to be transmitted next time into the serial data line in synchronization with the clock signal.

3. The information processing device according to claim 1;
wherein, with respect to a function of the information processing device to be executed by way of a control of the master device, the slave device is a device that carries out a control to either change the function, or add another function.

4. The information processing device according to claim 1;
wherein the information processing device is an IC card reader/writer;
the master device is a main processing device that controls writing/reading information into/from an IC card; and
the slave device is a sub processing device that executes encryption of the information, or processes encrypted information.

5. The information processing device according to claim 1;
wherein, if having received a reset command or having detected the power supply being turned on, the slave device sets a port, to which at least one of a connection terminal of the serial clock line and a terminal of the serial data line is connected, as an output port that outputs the notification of the starting condition.

6. The information processing device according to claim 5;
wherein, with a start of an initializing process, the slave device notifies of the start of the initializing process by way of inverting a signal level of at least one of the serial clock line and the serial data line that are connected to the connection terminals, in relation to which the output port has been set; and
the master device detects the slave device having started the initializing process by way of watching for the signal level to be inverted.

7. The information processing device according to claim 6;
wherein, after the initializing process finishes, the slave device notifies that the initializing process has finished, by way of re-inverting the signal level; and
the master device watches for the signal level to be re-inverted after once being inverted, in order to detect the slave device having finished the initializing process.

8. The information processing device according to claim 7;
wherein, after notifying of an end of the initializing process, the slave device sets a connection terminal to which the serial clock line is connected as an input port, and sets a connection terminal to which the serial data line is connected as an input port; and
after detecting the slave device having finished the initializing process, the master device transmits a starting condition for a data communication to the slave device.

9. The information processing device according to claim 8;
wherein the starting condition for the data communication, in which the master device makes a transmission, is that a signal level of the serial data line is shifted so as to become low while a signal level of the serial clock line is high.

10. The information processing device according to claim 5;
wherein, with a start of an initializing process, the slave device inverts a signal level of at least one of the serial clock line and the serial data line that are connected to the connection terminals, in relation to which the output port has been set; and after the initializing process finishes, the slave device notifies that the initializing process has finished, by way of re-inverting the signal level;
the master device watches for the signal level to be re-inverted after once being inverted, in order to detect the slave device having finished the initializing process.

11. A data communication method including a datum transmission by a master device and a slave device, which are connected to each other by using two types of signal lines comprising a serial clock line and a serial data line, by using the two types of signal lines according to a predetermined communication method, the method comprising:
commencing a starting operation by the slave device if either the master device resets the slave device, or a power supply to the master device and the slave device is turned on;
starting an initializing process at the time of start by the slave device, and notifying the master device of the starting condition by way of at least one of the serial clock line and the serial data line; and enabling a start of a data communication by way of setting a port, to which the serial data line is connected, as an output port by the master device if the master device detects the initializing process having finished at the slave device according to the notification of the starting condition.

* * * * *